United States Patent
Hopkins et al.

(10) Patent No.: US 12,210,850 B1
(45) Date of Patent: Jan. 28, 2025

(54) INGESTION AND SEGMENTATION OF REAL-TIME EVENT DATA

(71) Applicant: THE HUNTINGTON NATIONAL BANK, Columbus, OH (US)

(72) Inventors: Andrew Hopkins, Columbus, OH (US); Raghu Mundru, Columbus, OH (US); Steven Hittle, Columbus, OH (US)

(73) Assignee: THE HUNTINGTON NATIONAL BANK, Columbus, OH (US)

( * ) Notice: Subject to any disclaimer, the term of this patent is extended or adjusted under 35 U.S.C. 154(b) by 0 days.

(21) Appl. No.: 18/768,865

(22) Filed: Jul. 10, 2024

(51) Int. Cl.
*G06F 7/08* (2006.01)
*G06F 16/2455* (2019.01)
*G06F 16/2457* (2019.01)
*G06F 16/248* (2019.01)

(52) U.S. Cl.
CPC .......... *G06F 7/08* (2013.01); *G06F 16/24568* (2019.01); *G06F 16/24578* (2019.01); *G06F 16/248* (2019.01)

(58) Field of Classification Search
CPC ................. G06F 7/08; G06F 16/24568; G06F 16/24578; G06F 16/248
See application file for complete search history.

(56) References Cited

U.S. PATENT DOCUMENTS

| | | | | |
|---|---|---|---|---|
| 10,176,034 B2* | 1/2019 | Brew | .................. | G06F 11/0793 |
| 11,582,139 B2* | 2/2023 | Hauser | .................. | H04L 63/083 |
| 11,610,413 B1* | 3/2023 | Nguyen | .................. | G06V 20/44 |
| 2003/0004966 A1* | 1/2003 | Bolle | .................. | G06F 16/5846 |
| | | | | 707/E17.103 |
| 2008/0021860 A1* | 1/2008 | Wiegering | .......... | G06F 16/9538 |
| 2014/0172847 A1* | 6/2014 | Wiegering | .......... | G06F 16/9535 |
| | | | | 707/728 |
| 2016/0105372 A1* | 4/2016 | Vasudevan | .............. | H04L 47/83 |
| | | | | 709/226 |
| 2017/0132306 A1* | 5/2017 | Brew | ................ | G06F 16/24568 |
| 2019/0319971 A1* | 10/2019 | Levy | .................... | H04L 63/0807 |
| 2021/0160185 A1* | 5/2021 | Murthy | .................... | H04L 67/10 |
| 2021/0241171 A1* | 8/2021 | Bonaci | .................... | G06N 20/00 |
| 2022/0012268 A1* | 1/2022 | Ghoshal | ................ | G06F 16/958 |
| 2022/0292525 A1* | 9/2022 | Ash | .................. | G06Q 10/06315 |
| 2023/0145360 A1* | 5/2023 | Gupta | ................ | G06Q 20/4016 |
| | | | | 705/44 |

* cited by examiner

*Primary Examiner* — Jorge A Casanova
(74) *Attorney, Agent, or Firm* — Kilpatrick Townsend & Stockton LLP

(57) ABSTRACT

In some implementations, the techniques may include receiving event data as a stream of event instances. Each received event instance is associated with an entity and a capacity change. In addition, the techniques may include identifying an event time for each received event instance. The techniques may include sorting the received event instances into sets of instances. Each set of instances can be associated with a respective entity. Moreover, the techniques may include segmenting each set of instances into subsets of instances based on the event time for each event instance of the set of instances. Each of the plurality of subsets of instances can correspond to a time period. Also, the techniques may include storing each segmented set of instances as stored event data. Further, the techniques may include performing one or more operations with respect to the stored event data.

17 Claims, 7 Drawing Sheets

INGESTION AND SEGMENTATION OF REAL-TIME EVENT DATA

BACKGROUND

Repository organizations may need to maintain sufficient resources to satisfy their obligations to reposit entities. Traditionally, repository organizations would receive information about their reposit entities' capacity changes after a delay. The large volume of transactions within some repository organizations meant that event instances were processed in daily batches rather than in near real-time. The delayed reporting sometimes meant that a repository organization could not react appropriately to large net negative capacity changes. Accordingly, improvements to reporting are desirable.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, the disclosed techniques may include receiving event data having a stream of received event instances, where each received event instance is associated with an entity of a plurality of entities and a capacity change. The techniques may also include identifying an event time for each received event instance of the stream of event instances. The techniques may furthermore include sorting the received event instances into a plurality of sets of instances. Each set of instances of the plurality of sets of instances can be associated with a respective entity of the plurality of entities. The techniques may in addition include segmenting each set of instances of the plurality of sets of instances into a plurality of subsets of instances based on the event time for each event instance of the set of instances. Each of the plurality of subsets of instances may correspond to a time period. The techniques may moreover include storing each segmented set of instances as stored event data. The techniques may also include performing one or more operations with respect to the stored event data. Other embodiments of this aspect include corresponding methods, computer systems, apparatus, and computer programs recorded on one or more transitory or non-transitory computer storage devices (e.g., computer readable media), each configured to perform the actions of the techniques.

Implementations may include one or more of the following features. Techniques where the one or more operations may include: receiving a request identifying a particular entity and one or more time periods; retrieving a requested event data from the stored event data, the requested event data corresponding to the particular entity and the one or more time periods; and providing a user interface for exhibiting the requested event data. Techniques where the segmenting may include: identifying a net capacity change for each of the subsets of instances, the net capacity change of a respective subset of instances based at least in part on the capacity change of each event instance in the respective subset of instances. Techniques where the one or more operations may include: comparing a respective net capacity change of the respective subset of instances to a capacity threshold; and providing a notification in response to the respective net capacity change exceeding the capacity threshold. Techniques where comparing the respective net capacity change to the capacity threshold may include: generating a feature vector having information identifying the respective subset of instances, the information identifying each respective subset of instances having at least a date, a time, and an entity identifier; providing the feature vector as input to a trained machine learning model; and receiving the capacity threshold as output from the trained machine learning model. Techniques where the one or more operations may include: receiving a request identifying a time period; identifying one or more matching subsets of instances, where a matching subset of instances corresponds to the time period; identifying an order for the one or more matching subsets of instances, where the order is identified based at least in part on the net capacity change of each of the one or more matching subsets of instances; and providing an user interface for exhibiting the one or more matching subsets in the order. Techniques where the event time for a received event instance is a reception time at the ingestion engine. Implementations of the described techniques may include hardware, a method or process, or a computer tangible medium.

BRIEF DESCRIPTION OF THE DRAWINGS

Various embodiments in accordance with the present disclosure will be described with reference to the drawings, in which.

DETAILED DESCRIPTION

Figure 1:
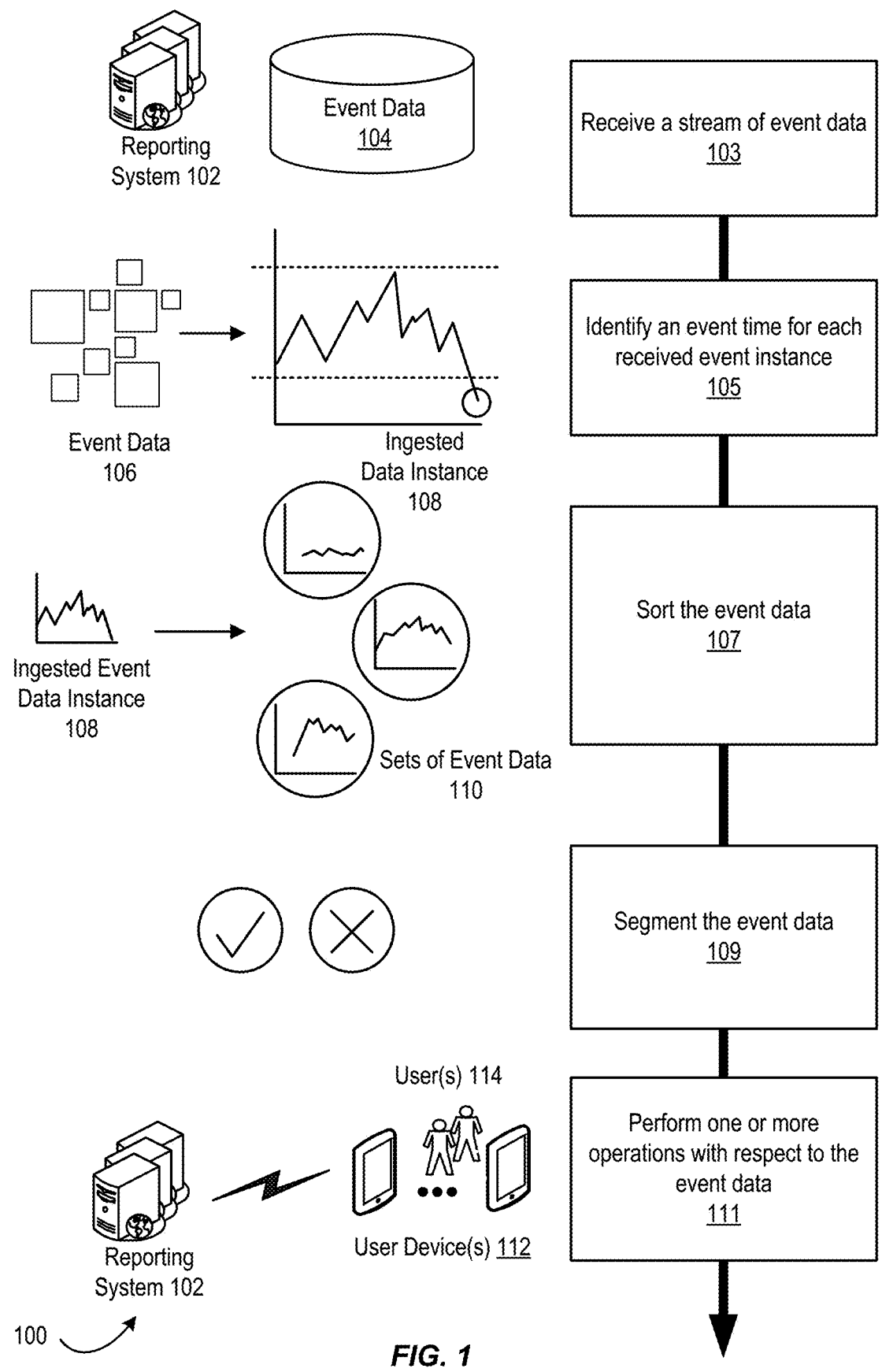
FIG. 1 is an example flow for reporting event data, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to near-real time event reporting. A repository organization may hold resources on behalf of one or more reposit entities (e.g., entities), and a reposit entity may be authorized by the repository organization (e.g., a bank) to take actions with respect to the held resources (e.g., currency). These actions by the reposit entity can be events that impose obligations on the repository organization. For example, the reposit entity can authorize a transfer of a portion of the resources held by the repository organization to another reposit entity or a third party. This authorized transfer can be an event that obligates the repository organization to make the resources available to the other reposit entity or the third party within a specified time period.

However, the reposit organization may not maintain a one-to-one ratio of held resources and available resources (e.g., resources that can be transferred within the specified time period) and the held resources may exceed the available resources. For example, the reposit entity may permit the repository organization to hold resources on the entity's behalf for a fee (e.g., an interest rate), and, in exchange, the repository organization is permitted to use the held resources to earn income. The repository organization can earn income by loaning a portion of held resources or otherwise investing the resources. However, loaning, or otherwise investing, the held resources may mean that the loaned or invested resources are not available to redeem customer transfer requests (e.g., events) for the term of the loan or investment. The ratio of held resources to available resources can be referred to as the liquidity of the repository organization.

A tension within repository organizations is that the organization must have sufficient available resources to meet the organization's short-term obligations towards its reposit entities, but the organization earns income by investing a portion of these held resources in long term investments. In some circumstances, reposit entities may question that a repository organization has sufficient held resources to satisfy the organization's obligations towards its reposit entities. In such circumstances, a large number of reposit entities may seek to transfer their held resources from the repository organization, and, if the requests exceed the available resources, the repository organization may become insolvent and fail. For example, a large outflow of resources may mean that the repository organization is forced to sell loans or investments at a loss to obtain sufficient resources to meet requests from entities.

Accordingly, the repository organization may monitor its activities to determine if sufficient resources are available to satisfy the organization's expected obligations. The repository organization's obligations can be received as events (e.g., event instances). The events can be received in near-real time at a reporting system, and the reporting system can identify or assign an event time to each received instance. The reporting system can sort and organize these event instances by entity and time period, and, through an analysis of these event instances, the reporting organization can identify, predict, and report changes to each entity's capacity (e.g., account balance) in a near real-time fashion.

The disclosed techniques described herein provide a technical advantage by providing a graphical user interface that ranks entities based on a net capacity change for a specified time period. The graphical user interface can present the entities in an order based on which entity is experiencing the largest outflow of resources from the repository organization. The reporting organization may include tens or hundreds of thousands of entities and identifying specific entities in a short amount of time can be technically challenging. This interface allows for the identification of potentially destabilizing entity behavior in near real-time and with a responsiveness that allows the repository organization to take appropriate action in response to the entity's behavior. The graphical user interface allows for entities with high net capacity changes to be identified in a more efficient manner with fewer page views and less input to the interface. Rather than visiting each individual entity's information on a separate graphical user interface view, the information for many entities can be compared, ranked, and presented on a single graphical user interface view.

The disclosed techniques disclosed herein provide a technical advantage by generating time series data from the event data. The event data may not be associated with an event time, and the reporting system can assign an event time to each received event instance. The assigned event times can allow for analysis of the data in the time domain that would not be possible without assigning these techniques. The event times are assigned to extremely large volumes of data in a relatively short timeframe. In addition, the data mapping, and ingestion of the event data, can allow for a reduction in the amount of stored data retained by the system. Rather than creating duplicate copies of event data for each set, some embodiments allow for subsets and sets of event data to refer to a single store of event data. For example, a mapping can be used to identify and retrieve event instances for multiple sets of event data from a single store of event data without creating a duplicate set of event data for each set. Therefore, these techniques can reduce the reporting system's storage requirements. A repository organization may be a national or international organization with hundreds or thousands of local branches. Data may be stored at these branches or regionally resulting in duplicate data. The disclosed techniques allow for a single source of truth so that fewer copies of each datum can be used by multiple systems.

Some or all of the process (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Moving on to FIG. 1 which illustrates an example flow 100 for real-time reporting in accordance with at least one embodiment. The operations discussed in connection with FIG. 1 may be performed with a Reporting System 102. In some embodiments, Reporting System 102 may be implemented by one or more computer(s), as a service, within an application, or the like. The operations discussed in connection with FIG. 1 may be performed in any suitable order. More or fewer operations than those depicted in FIG. 1 may be employed without diverting from this disclosure.

The flow 100 may begin at 103, where time series data corresponding to a plurality of entities is obtained. The time series data can be received at an ingestion engine of the reporting system 102. The reporting system 102 can be operated by a repository organization, and this reporting system 102 can be accessed by employees or agents of the organization (e.g., users 114). The employees may monitor the net capacity change for entities associated with the repository organization to identify unusual behavior indicating that there is an outflow of a resource from the organization. Advanced notice of this outflow can allow the repository organization to take actions to mitigate the impact of the capacity change. For example, the employees could begin to arrange a new inflow of a resource so that the organization has sufficient resources on hand to meet requests to transfer a resource from the organization.

The time series data can be received from a variety of organizations. For example, if the repository organization is a banking organization, the time series data may be received from local branches of the bank, automated teller machines, merchants, and other financial institutions. The data may be received at various times and in various formats, and, for example the time series data can be received as a stream of event instances where each event is associated with an entity and a capacity change. The data could include transactions such as transfers of a resource from one account to another or a withdrawal of a resource from the repository organization. The event data can be received in near-real-time, and as described herein, near-real-time can mean that a datum of the event data is received within a threshold amount of time of the occurrence of the event corresponding to the datum. The threshold can be 1 second, 30 seconds, 1 minute, 5 minutes, 30 minutes, 1 hour, 2 hours, 6 hours, 8 hours, 12 hours, or 18 hours.

At 105, an event time can be identified for each datum of the received event data. The event time for a datum can be the time at which the event was initiated by the source, or the event time can be the time at which the event was received at the ingestion engine. The event data 106 may not include an event time, or the event time can be identified from the event data 106. The event data that has been assigned an event time can be ingested event time 108.

At 107, the event data can be sorted into sets of event data. The event data may be received as a continuous stream of event data for multiple entities. Sorting the event data can allow for an analysis of the event data for a particular entity. A set of event data can include event data that is associated with a particular entity (e.g., a reposit entity). Event data can be associated with more than one entity, and an instance of event data may be sorted into multiple sets of event data 110.

At 109, the event data can be segmented into one or more subsets of event data. The entity data may need to be sorted into different subsets corresponding to different time periods. The sorted subsets can allow for an analysis of an entity's capacity over time. The event data can be segmented based on the event time for each instance of event data in a set of event data.

At 111, one or more operations can be performed with respect to the event data. For example, the subsets of event data from 109 can be compared to one or more thresholds, and a notification from the reporting system 102 to user device(s) 112 can be generated. The thresholds may be generated by a trained machine learning model. An entity's behavior may change over time and an irregular capacity change for one organization may be normal behavior for a second organization. A machine learning model can be trained on an entity's past behavior to determine an expected capacity change for a time period. This expected capacity change can be used to determine a threshold for that entity. The user device(s) 112 can be any client device used by user(s) 114. The one or more operations can include generating a user interface and providing the user interface to client software or an internet browser on user device(s) 112.

Figure 2:
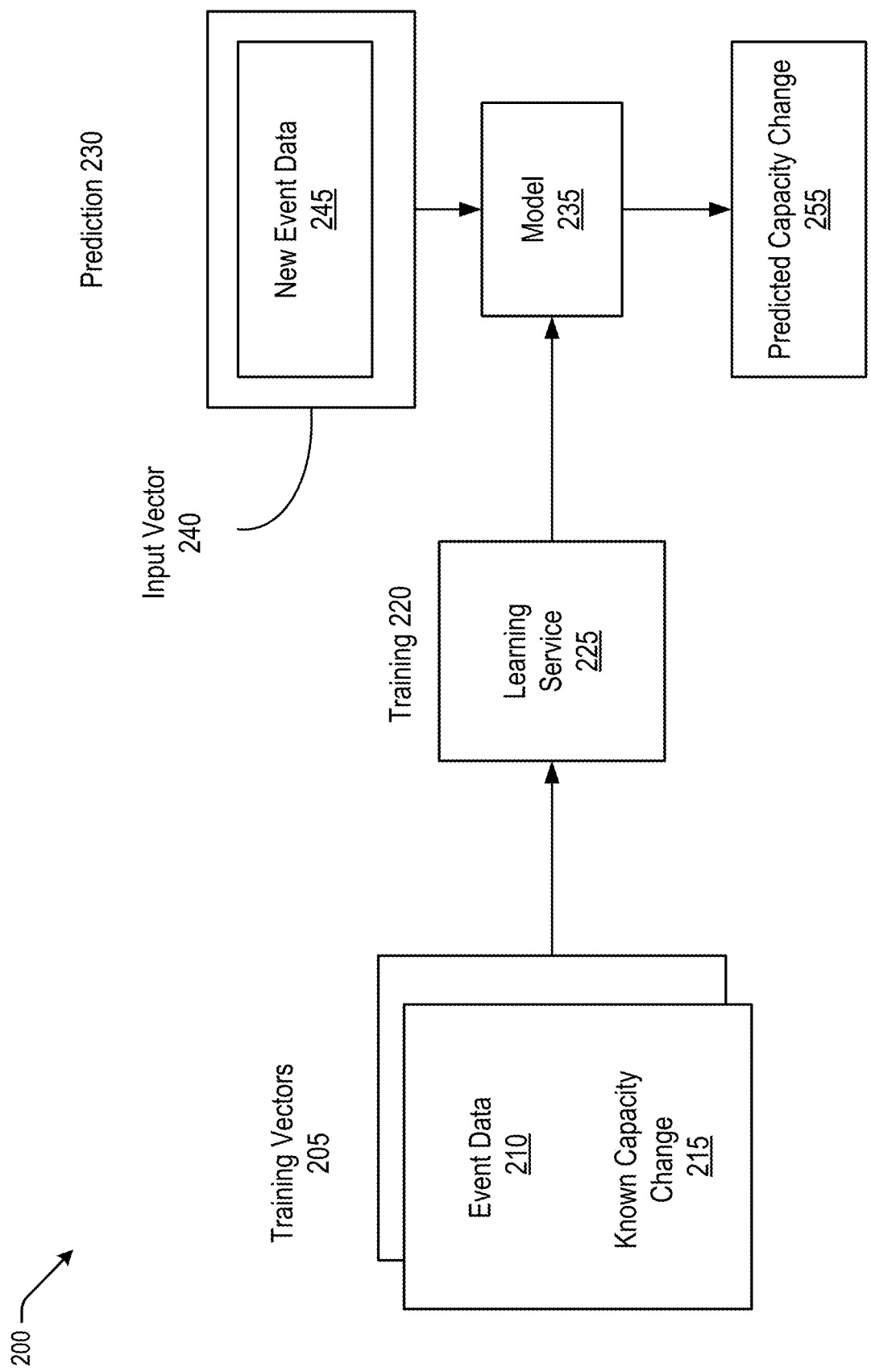
FIG. 2 shows a technique for training a machine learning model according to at least one embodiment.

FIG. 2 depicts an architecture for training a machine learning model according to the embodiments of the present disclosure. The machine learning model can be trained to estimate a capacity change for a particular entity and this prediction can be used to determine a threshold as described above in step 111. Training vectors 205 are shown with event data 210 and a known capacity changes 215. Event data 210 can include any information from a set of event instances or a subset of event instances as described herein. For case of illustration, only two training vectors are shown, but the number of training vectors may be much larger, e.g., 10, 20, 100, 1,000, 10,000, 100,000, or more. Training vectors could be made for any combination of different entities over the same time period, the same entity over different time periods.

Event data 210 have property fields that can correspond to the event data received at the reporting system (e.g., reporting system 400) during a time period and the skilled person will appreciate the various ways that such data can be configured. Known capacity changes 215 include the capacity change (e.g., a change in the resource associated with the entity) at a fixed time after the time period at which the event data 210 was recorded. For example, the known capacity change for a subset of event data that was recorded for an entity from 2:00 pm to 3:00 pm can be the capacity change for that entity at 4:00 pm. The fixed time can be 30 minutes, 1 hour, 90 minutes, 2 hours, 3 hours, 4 hours, 6 hours, 8 hours, 12 hours, 18 hours, 24 hours, and 36 hours.

Training vectors 205 can be used by a learning service 225 to perform training 220. A service, such as learning service 225, being one or more computing devices configured to execute computer code to perform one or more operations that make up the service. Learning service 225 can optimize parameters of a model 235 such that a quality metric (e.g., accuracy of model 235) is achieved with one or more specified criteria. The accuracy may be measured by comparing known capacity changes 215 to predicted capacity changes 255. Parameters of model 235 can be iteratively varied to increase accuracy. Determining a quality metric can be implemented for any arbitrary function including the set of all risk, loss, utility, and decision functions.

In some embodiments of training, a gradient may be determined for how varying the parameters affects a cost function, which can provide a measure of how accurate the current state of the machine learning model is. The gradient can be used in conjunction with a learning step (e.g., a measure of how much the parameters of the model should be updated for a given time step of the optimization process). The parameters (which can include weights, matrix transformations, and probability distributions) can thus be optimized to provide an optimal value of the cost function, which can be measured as being above or below a threshold (i.e., exceeds a threshold) or that the cost function does not change significantly for several time steps, as examples. In other embodiments, training can be implemented with methods that do not require a hessian or gradient calculation, such as dynamic programming or evolutionary algorithms.

A prediction stage 230 can provide a predicted capacity change 255 for a new entity's entity signature vector 240 based on new event data 245. The predicted capacity change 255 can be a predicted change to the resource held by the repository organization on behalf of the entity corresponding to the input vector 240. The new event data 245 can be of a similar type as event data 210. If new event data 245 values are of a different type, a transformation can be performed on the data to obtain data in a similar format as event data 210. Ideally, predicted capacity change 255 corresponds to the true capacity change for input vector 240.

A "machine learning model" (ML model) can refer to a software engine configured to be run on one or more processors to provide a classification or numerical value of a property of one or more samples. An ML model can be generated using sample data (e.g., training data) to make predictions on test data. One example is an unsupervised learning model. Another example type of model is supervised learning that can be used with embodiments of the present disclosure. Example supervised learning models may include different approaches and algorithms including analytical learning, statistical models, artificial neural network, backpropagation, boosting (meta-algorithm), Bayesian statistics, case-based reasoning, decision tree learning, inductive logic programming, Gaussian process regression, genetic programming, group method of data handling, kernel estimators, learning automata, learning classifier systems, minimum message length (decision trees, decision graphs, etc.), multilinear subspace learning, naive Bayes classifier, maximum entropy classifier, conditional random field, nearest neighbor algorithm, probably approximately correct learning (PAC) learning, ripple down rules, a knowledge acquisition methodology, symbolic machine learning algorithms, subsymbolic machine learning algorithms, minimum complexity machines (MCM), random forests, ensembles of classifiers, ordinal classification, data preprocessing, handling imbalanced datasets, statistical relational learning, or Proaftn, a multicriteria classification algorithm. The model may include linear regression, logistic regression, deep recurrent neural network (e.g., long short term memory, LSTM), hidden Markov model (HMM), linear discriminant analysis (LDA), k-means clustering, density-based spatial clustering of applications with noise (DBSCAN), random forest algorithm, support vector machine (SVM), or any model described herein. Supervised learning models can be trained in various ways using various cost/loss functions that define the error from the known label (e.g., least squares and absolute difference from known classification) and various optimization techniques, e.g., using backpropagation, steepest descent, conjugate gradient, and Newton and quasi-Newton techniques.

Examples of machine learning models include deep learning models, neural networks (e.g., deep learning neural networks), kernel-based regressions, adaptive basis regression or classification, Bayesian methods, ensemble methods, logistic regression and extensions, Gaussian processes, support vector machines (SVMs), a probabilistic model, and a probabilistic graphical model. Embodiments using neural networks can employ using wide and tensorized deep architectures, convolutional layers, dropout, various neural activations, and regularization steps.

Figure 3:
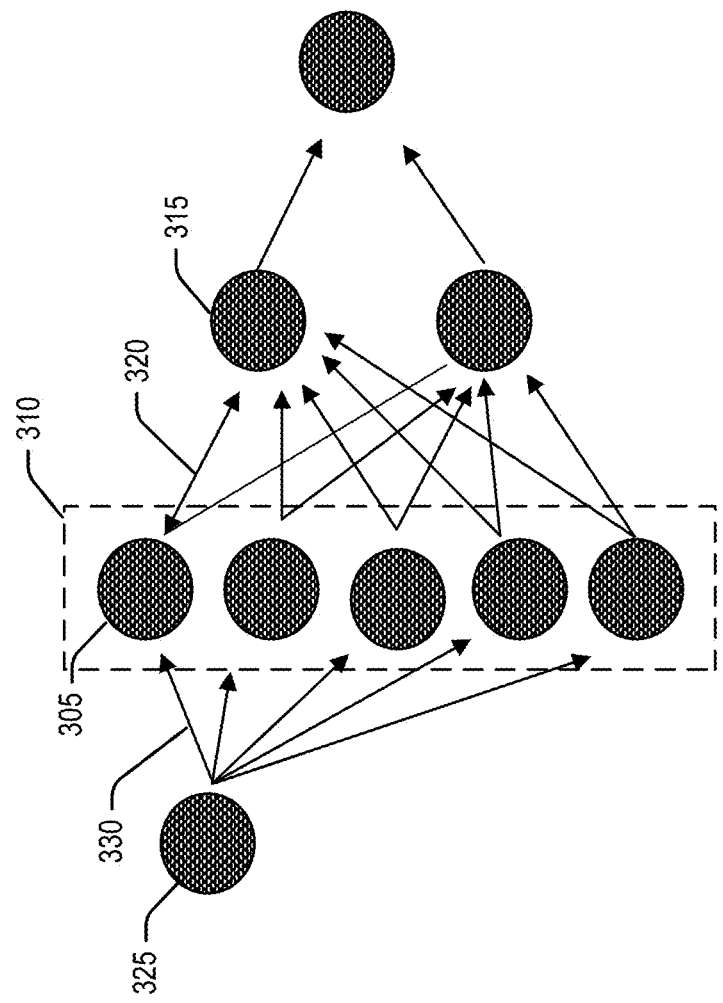
FIG. 3 shows an example machine learning model of a neural network according to at least one embodiment.

FIG. 3 shows an example machine learning model of a neural network, according to at least one embodiment. As an example, model 335 can be a neural network that includes a number of neurons (e.g., Adaptive basis functions) organized in layers. Model 335 can be an example of a machine learning model that can be trained using architecture 200. For example, neuron 305 can be part of layer 310. The neurons can be connected by edges between neurons. For example, neuron 305 can be connected to neuron 315 by edge 320. A neuron can be connected to any number of different neurons in any number of layers. For instance, neuron 305 can be connected to neuron 325 by edge 330 in addition to being connected to neuron 315.

The training of the neural network can iteratively search for the best configuration of the parameter of the neural network for feature recognition and prediction performance. Various numbers of layers and nodes may be used. A person with skills in the art can easily recognize variations in a neural network design and design of other machine learning models. For example, neural networks can include graph neural networks that are configured to operate on unstructured data. A graph neural network can receive a graph (e.g., nodes connected by edges) as an input to the model and the graph neural network can learn the features of this input through pairwise message passing. In pairwise message passing, nodes exchange information and each node iteratively updates its representation based on the passed information.

Figure 4:
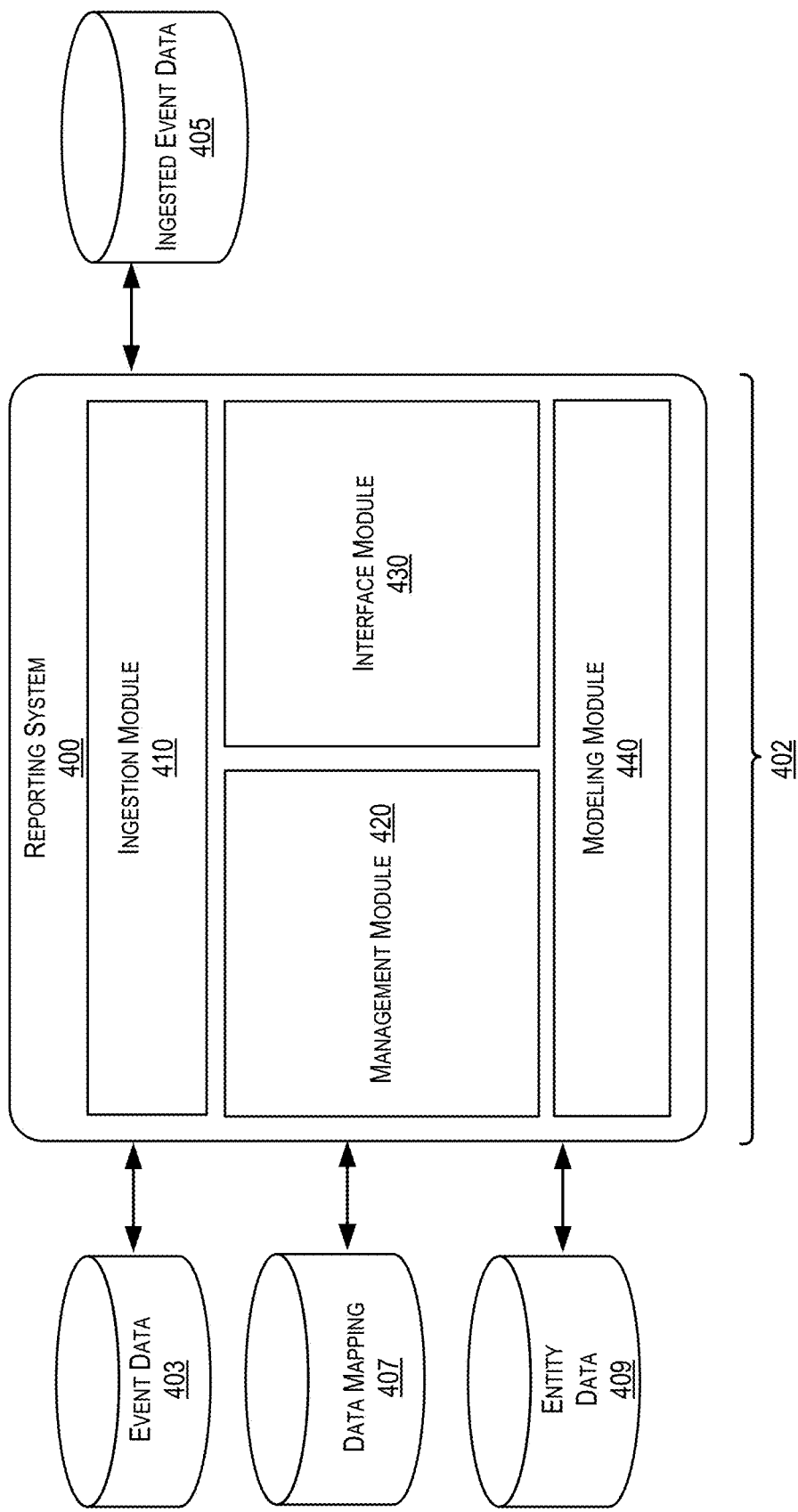
FIG. 4 is a schematic diagram of an example computer architecture for the reporting system, including a plurality of engines that may perform functions in accordance with at least one embodiment.

FIG. 4 is a schematic diagram of an example computer architecture for the Reporting System 400, including a plurality of engines that may perform functions in accordance with at least one embodiment. The engines may be software engines, hardware engines, or a combination thereof. If the engines are software engines, the engines can be embodied on a computer readable medium and processed by a processor in any of the computer systems described herein. It should be noted that any engine or data store described herein, may be, in some embodiments, be a service responsible for providing functionality corresponding to the engine described below. The engines 402 may be execute as part of the Reporting System 400, or the engines 402 may exist as separate engines or services external to the Reporting System 400. Reporting system 400 is an example of the reporting system 102. In some embodiments, the engines 402 may be executed by the same or different computing devices, as a service, as an application, or the like.

In the embodiment shown in the FIG. 4, data stores such as event data 403, ingested event data 405, data mapping 407, and entity data 409 are shown, although data can be maintained, derived, or otherwise accessed from various data stores, either remote or local to the Reporting System 400, to achieve the functions described herein. The Reporting System 400, as shown in FIG. 4, includes various engines such as an ingestion engine 410, a management engine 420, an interface engine 430, and a modeling engine 440. Some functions of the engines 410-440 are described below. However, for the benefit of the reader, a brief, non-limiting description of each of the engines is provided in the following paragraphs. In accordance with at least one embodiment, a process generating and reporting event data is provided.

In at least one embodiment, the Reporting System 400 includes the ingestion engine 410. Generally, the ingestion engine 410 may be utilized to receive any suitable information with respect to any example provided herein. By way of example, the ingestion engine 410 may be configured to receive a stream of event data. The event data may be received as it is generated in a continuous stream of data corresponding to event instances or the event data may be received in periodic batches. If necessary, the raw event data may be stored as event data 403 and accessed by the ingestion engine 410. The event data can be received from one or more event system(s) that are associated with the repository organization or one or more external repository organization. The event system(s) may be computing devices that facilitate transactions between reposit organizations. The stream can be received over a network such as the internet.

The ingestion engine 410 may ingest the event data by cleaning, processing, or otherwise transforming the event data 403, and the ingestion engine 410 can store the ingested data as ingested event data 405. Ingesting the event data 403 can include removing duplicate data, changing data from one format to another (e.g., changing a date from mm/dd/yyyy to yyyy-mm-dd), completing incomplete data entries, correcting corrupted data entries, removing unnecessary data from an event instance, anonymizing data, or otherwise making the event data 403 suitable for use by the other engines 402.

To ingest the event data 403, the ingestion engine 410 may assign an event time for each received event instance in the stream of event data. The event time can be the time at which information corresponding to an event instance is received at the ingestion engine 410. In some embodiments, the event time can be a time at which an event was initiated and the ingestion engine 410 can retrieve this information from the event data. The ingestion engine 410 may assign an event time to event data representing an event instance by associating the event data with information the event time (e.g., in data mapping 407), or the ingestion engine may add a field to an entry in event data that represents an event instance. In addition, each event instance may be uniquely identified by an instance identifier. The ingestion engine 410 can store the ingested event data to ingested event data 405, and, in addition or alternatively, the ingestion engine 410 can store mapping of event times to event in data mapping 407.

In at least one embodiment, the Reporting System 400 includes the management engine 420. Generally, the management engine 420 may be utilized to organize and associate the ingested event data 405. For example, the management engine 420 can sort the event instances in the ingested event data 405 into sets or subsets of event instances based on any applicable criteria. For example, the management engine can create sets of data for each entity identified in the ingested event data 405. Each entry in the ingested event data 405 may include the instance identifier and one or more fields identifying entities (e.g., entity identifiers). For example, an entry for an event instance may include an entity identifier for a source of the event and an entry for a destination of the event. An event can be a transaction that authorizes a transfer of a resource from a source to a destination.

Creating a set of data for an entity can mean that the management engine 420 creates an entry in data mapping 407 for that entity (e.g., a set mapping). The set mapping can include a field for an entity identifier that identifies the entity for which the set is to be created (e.g., the set's entity identifier). To create the set, the management engine 420 may identify the instance identifier of each event instance in the ingested event data 405 that includes the set's entity identifier (e.g., as a source or a destination). The management engine may add the identified instance identifiers to the set mapping for the entity in data mapping 407. In this way, the entity's set mapping in data mapping 407 can be used to identify a set of ingested event data 405 that corresponds to the entity. In some embodiments, management engine 420 may use set mappings from data mapping 407 to retrieve ingested event data 405 in response a request from any of the engines 402.

The management engine 420 can use the event times assigned by the ingestion engine 410 to create subsets of the ingested event data 405 that correspond to particular time periods. For example, the management engine 420 can retrieve a set of event instances from the ingested event data 405 using a set mapping in data mapping 407. The management engine can then create the subsets of data by using the event times in the event data to filter the retrieved set of event data into subsets of event data for particular time periods. In some embodiments, the set mapping can identify the event time for each event instance and the set mapping can be used to directly retrieve the event instances that correspond to the requested time period. In some embodiments, a subset mapping representing the event instances associated with an entity that have event times within a specified time period can be created for each time period.

The management engine 420 may also identify groups of related entities using entity data 409. There may be hierarchical relationships between entities, and, for example, an entry may represent an account with the repository organization (e.g., a bank account). Accordingly, the management engine 420 may use the entity data 409 to identify related groups of entities and to distinguish between a movement of resources within the repository organization (e.g., between related entities) or outflows of resources from the repository organization.

The management engine 420 may calculate one or more values for each set mapping or subset mappings. For example, a net capacity change can be calculated for any number of set mappings or subset mappings. The capacity change for an event instance can be an amount of a resource that is provided to an entity (e.g., if the entity is the destination) or removed from an entity (e.g., if the entity is the source). The management engine 420 can determine the net capacity change for a group of event instances associated with an entity by tallying the capacity change for instances where the entity is the destination (e.g., positive capacity changes) and tallying the capacity change for instances where the entity is the source (e.g., negative capacity changes). The management engine 420 can calculate the difference between these two tallies (e.g., subtract the magnitude of the negative capacity change from the magnitude of the positive capacity change), and the resulting sum can be the net capacity change. The management engine 420 can add the net capacity change to a set mapping or a subset mapping in data mapping 407.

In at least one embodiment, the Reporting System 400 includes the interface engine 430. Generally, the interface engine 430 may be utilized to generate graphical user interfaces, provide the graphical user interfaces to client devices (e.g., to client software or in a browser), provide output to the graphical user interfaces, and receive input from the graphical user interfaces. The interface engine 430 can be used to provide notifications to one or more client devices and to generally perform one or more operations with respect to the event data in reporting system 400.

A graphical user interface can be generated to display requested event data. For example, the interface engine 430 can receive a request from a user. The request can be a request for a particular entity (e.g., by an entity identifier) and one or more time periods. The interface engine 430 can provide the information in the request to the management engine 420, and the management engine can retrieve the event data (e.g., subsets or sets of event instances) in response to the request. The request may be for any subset of event instances that contain at least one instance with an event time within one or more specified time periods.

The management engine 420 can identify and retrieve the subsets from ingested event data 405 using subset mappings from data mapping 407. In some embodiments, the management engine 420 can determine an order for the identified subsets. The order can a descending or ascending order based on the net capacity change for each subset, and the order can proceed from the largest net negative capacity change to the largest net positive capacity change. In addition or alternatively, the order can proceed from the largest net positive capacity change to the largest net negative capacity change.

The interface engine 430 can generate a user interface for displaying the requested subsets of event data in the order determined by the management engine 420. The interface engine can calculate a position for a graphical element representing each subset, and the engine can provide information that causes a client device to display the graphical elements in the order. In this way, the reporting system 400 can identify and display the entities with the largest net change in capacity from tens or hundreds of thousands of entities managed by the reporting system 400. These entities can be identified and displayed in near-real time (e.g., within an hour of an event).

In at least one embodiment, the Reporting System 400 includes the modeling engine 440. Generally, the modeling engine 440 can be used to compare event data to one or more rules, to train a machine learning model, or to use a machine learning model to classify event data. For example, the modeling engine can request and receive a net capacity change for one or more subsets of event data (e.g., subsets of event instances) from the management engine 420. The modeling engine 440 can compare a retrieved net capacity to a capacity threshold. If the net capacity exceeds the capacity threshold, the modeling engine 440 can instruct the interface engine 430 to provide a notification to one or more client devices (e.g., a device of an employee or agent of the repository organization). In addition or alternatively, the interface engine 430 may cause a graphical user interface to display a graphical element identifying one or more subsets that exceeded the threshold.

The modeling engine 440 may calculate the capacity threshold. The capacity threshold can be a magnitude of a net capacity change, a percentage net capacity change between time periods, or a rate of change in the net capacity threshold over several time periods. The capacity threshold can be a general capacity threshold for all entities or there can be separate capacity thresholds for particular classes of entities (e.g., all car dealerships). The capacity threshold can be adjusted for different time periods or seasonally adjusted throughout the year. The capacity threshold can be adjusted for a geographic location corresponding to each entity, and the capacity threshold may be adjusted for the length of time that the entity has been associated with the repository organization.

The modeling engine 440 can implement multiple capacity thresholds as a set of rules. These rules can be manually specified and the modeling engine 440 can compare net capacity changes to an appropriate rule based on information about the entity from entity data 409 and information in the ingested event data 405.

The modeling engine 440 can implement the capacity thresholds with machine learning models. A feature vector can be generated for each subset of data. For example, the feature vector for a subset of event data can include any combination of an entity identifier for the source of any number of event instances, an entity identifier for the destination of any number of event instances, information identifying one or more associated entities for these entity identifiers, a total number of event instances in the subset, an event time for each event instance in the subset, a capacity change for each event instance in the subset, a net capacity change for the subset, a location for each entity identifier in the subset, an event time for each event identifier, a starting capacity for the entity associated with the subset (e.g., a capacity at the beginning of the time period), an end capacity for the entity associated with the subset (e.g., a capacity at the end of the time period), and any combination of these categories of information for one or more additional subsets associated with the entity associated with the subset.

As described above, the feature vectors can be used to train a machine learning model or to receive a classification for the subset represented by the feature vector. The output of the machine learning model can be a predicted capacity change and the capacity threshold can be the predicted capacity change or a value calculated from the predicted capacity change (e.g., 150% of the predicted capacity change). Feature vectors and capacity thresholds can be generated for sets of event data in addition to subsets of event data.

Figure 5:
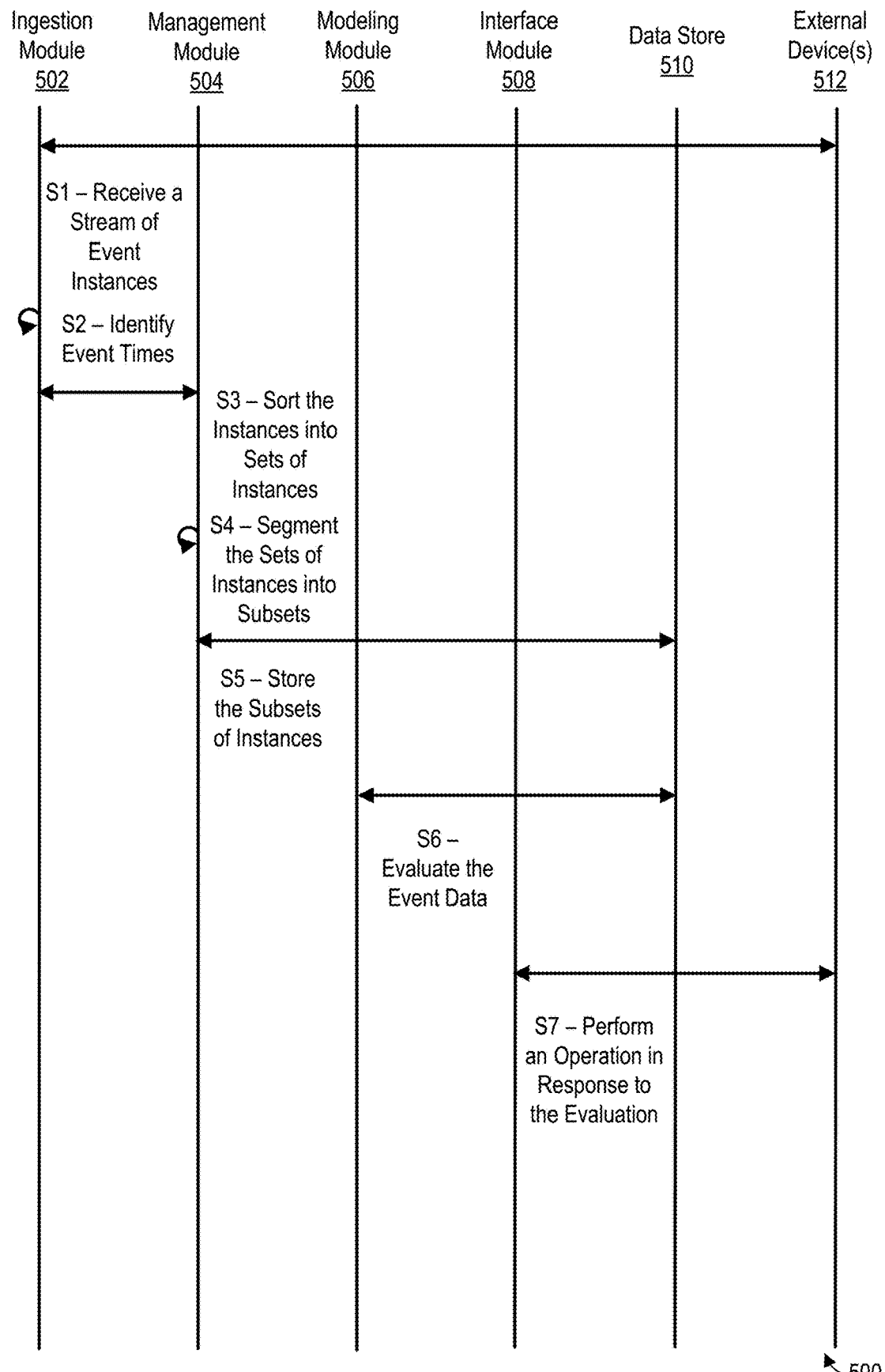
FIG. 5 is a sequence diagram showing a technique for reporting event data according to at least one embodiment.

FIG. 5 is a sequence diagram 500 showing a technique for reporting event data according to various embodiments. At S1, an ingestion engine 502 can receive a stream of instances. Ingestion engine 502 can be an example of ingestion engine 410. The event instances can be received at the ingestion engine 502 from external devices(s) 512 (e.g., event systems, client devices, user devices).

At S2, the ingestion engine 502 can identify event times for the event instances from S1. Identifying an event time can mean that the ingestion engine 502 identifies a time at which the event instance is received at the ingestion engine 502 from the external device(s) 512, and the ingestion engine 502 assigns the event time to the instance.

At S3, the management engine 504 can sort the instances from S2 into sets of instances. Management engine 504 can be an example of management engine 420. A set of instances can include all event instances from S2 that include a particular entity identifier.

At S4, the management engine 504 can segment the sets of instances from S3 into subsets of instances. A subset of instances can be the instances from a set of instances from S3 that correspond to a particular time period (e.g., a range of time).

At S5, the management engine 504 can store the subsets of instances to data store 510. Storing the subsets of instances can meant that a mapping of instances to a subset are stored by the management engine 504. The management engine may calculate one or more values based on the subset and the values can be stored with the subset. For example, the management engine 504 can calculate a net capacity change for each subset.

At S6, the modeling engine 506 can evaluate the data. Modeling engine 506 can be an example of modeling engine 440. Evaluating the data can mean comparing one or more values for a subset of event instances to one or more thresholds. In addition or alternatively, the modeling engine 506 may generate a feature vector for a subset and provide the vector as input to a trained machine learning model. The output of the machine learning model can be an expected capacity change that can be used to calculate a capacity threshold.

At S7, the interface engine 508 can perform one or more actions in response to the evaluation from S6. Interface engine 508 can be an example of interface engine 430. For example, if a threshold is exceeded, the interface engine 508 can provide a notification to one or more external devices 512 (e.g., a user device, a client device, etc.). The interface model 508 may provide a user interface for viewing the evaluated data to the external devices 512.

Figure 6:
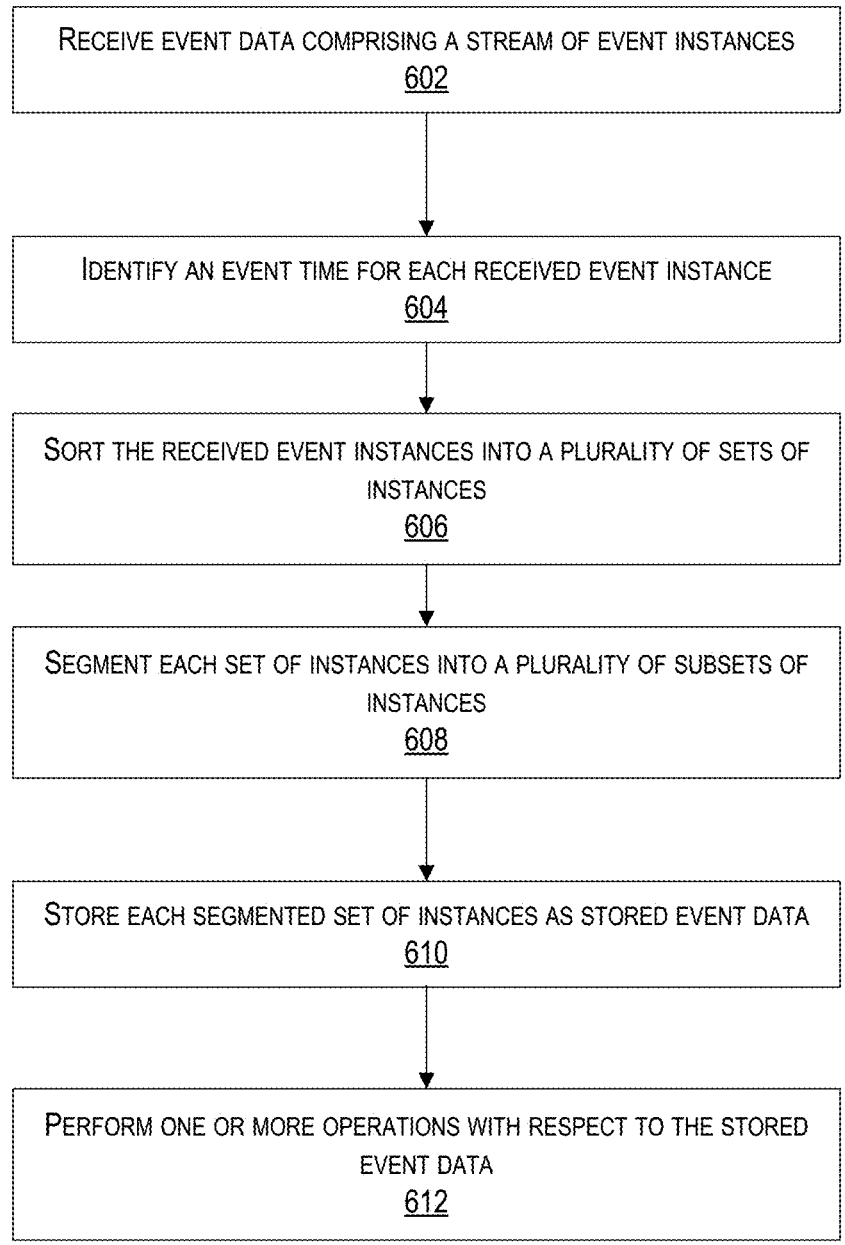
FIG. 6 is a block diagram illustrating an example method for reporting event data, in accordance with at least one embodiment.

FIG. 6 is a block diagram illustrating an example method 600 for near real-time reporting of event data, in accordance with at least one embodiment. A non-transitory computer-readable storage medium may store computer-executable instructions that, when executed by at least one processor, cause at least one computer to perform instructions comprising the operations of the method 600. It should be appreciated that the operations of the method 600 may be performed in any suitable order, not necessarily the order depicted in FIG. 6. Further, the method 600 may include additional, or fewer operations than those depicted in FIG. 6. The operations of method 600 may be performed by any suitable portion the Reporting System 102 of FIG. 1. In some embodiments, method 600 may be executed by components of Reporting System 400 of FIG. 4. In some embodiments, method 600 may be executed by components of Computing Device 700 of FIG. 7.

The method 600, may begin at 602, event data can be received. The event data can be received as a stream of event instances (e.g., a stream of received event instances). Each received event instance can be associated with an entity of a plurality of entities. An entity can be an individual or organization for which a repository organization holds resources. In some embodiments, an event instance can be associated with a capacity change. For example, the capacity change for an event can be the magnitude of an increase or decrease to a resource held by a repository organization on behalf of an entity. An event can be an instruction to transfer an amount of a resource from a source entity to a destination entity, and the capacity change can be the quantity of transferred resources. An amount of a resource equal to the capacity change is transferred from the source to the destination.

At 604, an event time is identified for each received event instance. The event time can be the time at which the event is initiated or the time at which the event is received at a repository organization (e.g., at a reporting system).

At 606, the received event instances can be sorted into a plurality of sets of instances. The received event instances can include information identifying the entity associated with the event instance. An event can be associated with two entities in some instances. For example, an event can be a transfer of a resource from a source to a destination. In such circumstances, the source can be an entity that is associated with the event and the destination can be an entity that is associated with the event. A set of instances can be all of the events that are associated with an entity (e.g., as a source or destination).

At 608, each set of instances of the plurality of sets of instances from 606 can be segmented into a plurality of subsets of instances. A subset of instances can correspond to a time period and the sets of instances can be sorted into the subsets of instances based on the event time identified at 604. The time period for a set of instances can be a minute, 6 minutes, 10 minutes, 15 minutes, 30 minutes, an hour, 90 minutes, 2 hours, 3 hours, 6 hours, 8 hours, 12 hours, or 24 hours.

Segmenting the sets of instances into subsets of instances can include identifying a net capacity change for each of the subsets of instances. For example, each event in a subset of instances can include a capacity change, and the net capacity change for the subset of instances can be determined by aggregating the capacity change for each event instance in the subset. The respective net capacity change for a respective subset of instances can be compared to a capacity threshold. A notification can be provided in response to the respective net capacity change exceeding the capacity threshold.

The capacity threshold can a fixed threshold for any combination of one or more entities or one or more time periods. In some embodiments, the capacity threshold can vary between time periods and, for example, a negative net capacity change (e.g., an outflow of a resource from an entity) may be expected for some time periods but anomalous for other time periods. For example, an entity may pay its employees on the $1^{st}$ and $15^{th}$ day of each month. Accordingly, a large negative net capacity change may be expected on the $1^{st}$ but would be unusual on the $7^{th}$.

The capacity threshold can be assigned by a machine learning model in some embodiments. A feature vector can be generated for any combination of an entity or a time period. A feature vector can be an ordered list of numeric properties describing any combination of subset(s) of instances. The subset(s) of instances can be a subset of instances for an entity and a time period. The subset(s) of instances can be a collection of subsets of instances for multiple entities at a particular time period. The subset(s) of instances can be a collection of subsets of instance for a single entity at multiple time periods.

The feature vectors can be generated by a modeling engine, and the feature vector for each respective subset of instances can comprise information identifying the subset. The information identifying the subset can comprise any combination of a date, a time, an entity identifier, a total number of events, a capacity for the entity identified by the entity identifier, and a net capacity change for the subset. The feature vector can be provided as input to a trained machine learning model, and a capacity threshold can be received as output from the trained machine learning model.

The machine learning model can be trained on the past behavior of entities to determine an expected change in capacity for the entity at a particular time period. The capacity threshold can be a particular net negative capacity change, and, in some embodiments, there may not be a threshold for a net positive capacity change (e.g., a net increase in a resource). The output from the machine learning model can be an expected net capacity change for an entity at a time period, and the capacity threshold can be a calculated from the expected net change. For example, the capacity threshold can be 125% of an expected net capacity change for an entity at a time period.

At 610, the segmented sets of instances from 608 can be stored as stored event data. The segmented sets of instances can be stored to a datastore such as data store 612.

At 612, one or more operations can be performed with respect to the stored event data. For example, the one or more operations can comprise presenting event data on a user interface. In this example, a request identifying a particular entity and one or more time periods can be received at an interface engine. A management engine of the reporting system can retrieve the information identified in the request from the data store from 610. The requested data can be the subsets of data for the particular entity that correspond to the one or more time periods. An interface engine can provide a user interface for exhibiting the requested event data. The user interface can be provided to client software or a web browser that are associated with the request.

The one or more operations can include presenting a graphical user interface that displays one or more entities in an order that is determined based on the stored event data from 610. For example, the graphical user interface can present a list of entities with the largest net negative capacity change in a descending order based on the size of the negative capacity change. In some embodiments, the graphical user interface can be displayed in response to at least one entity exceeding a capacity threshold, and the interface can display all entities that exceeded the net capacity threshold for a time period within a specified window of time (e.g., the last 24 hours).

The graphical user interface can be implemented by an interface engine. A request identifying a time period can be received at the interface engine. The time period can be a single time period or a range of time periods (e.g., a window of time). The interface engine can identify one or more of the stored subsets of instances that match the request (e.g., matching subsets). The graphical user interface can identify an order for the one or more matching subsets of instances. The order can be based on one or more characteristics of the matching subsets of instances. In some circumstances, the order can be based on the net quantity change for each matching subset of instances. For example, the matching subset of instances with the largest negative net quantity change can be the placed first in the order, and the matching subset of instances with the largest positive net quantity change can be placed last in the order. If there are no matching instances with a positive net quantity change, the matching instance with the smallest negative net quantity change can be placed last in the order. The interface engine may provide a user interface for exhibiting the one or more matching subsets in the order.

In an illustrative example, a reporting system of a banking organization can receive a stream of transactions (e.g., event instances). These transactions can be associated with a time at which the transaction was initiated or when the transaction was received at the reporting system. The stream of transactions can be sorted by account (e.g., entity) to create sets of transactions for each account. The sets of transactions can be sorted by time period into subsets of transactions and a net change in the account balance can be determined for each time period. A threshold change in account balance can be determined using a machine learning model that estimates a net change in account balance for a given time period. The accounts can be ranked by the net change in account balance and a graphical user interface can display the accounts in descending order of the size of the net change in account balance for a given time period. If the net change in account balance exceeds a threshold, the reporting system may generate a notification to one or more user accounts.

Figure 7:
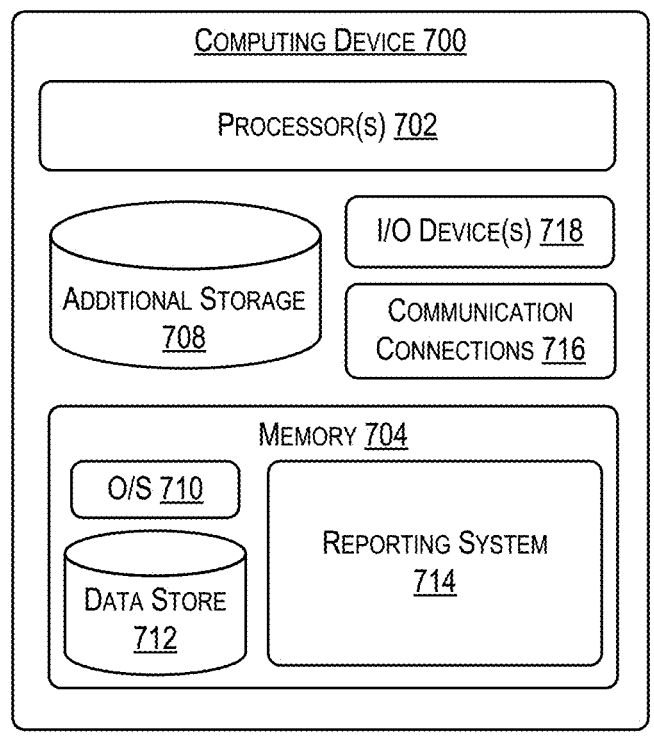
FIG. 7 illustrates an example computing device that may implement the methods disclosed herein.

FIG. 7 illustrates an example computing device 700 that may implement the methods disclosed herein. In some embodiments, the computing device 700 may include one or more processors (e.g., processor(s) 702). The processor(s) 702 may be implemented in hardware, computer-executable instructions, firmware, or combinations thereof. Computer-executable instruction or firmware implementations of the processor(s) 702 may include computer-executable or machine-executable instructions written in any suitable programming language.

Computing device 700 may include memory 704. The memory 704 may store computer-executable instructions that are loadable and executable by the processor(s) 702, as well as data generated during the execution of these programs. The memory 704 may be volatile (such as RAM) and/or non-volatile (such as ROM, flash memory, etc.). The computing device 700 may include additional storage 706, which may include removable storage and/or non-removable storage. The additional storage 706 may include, but is not limited to, magnetic storage, optical disks and/or tape storage. The disk drives and their associated computer-readable media may provide non-volatile storage of computer-readable instructions, data structures, program engines, and other data for the computing devices. In some implementations, the memory 704 or additional storage 706 may individually, or collectively, include multiple different types of memory, such as SRAM, DRAM, or ROM.

The memory 702 and/or additional storage 704 may be examples of computer-readable storage media. Computer-readable storage media may include volatile, or non-volatile, removable or non-removable media implemented in any method or technology for storage of information such as computer-readable instructions, data structures, program engines, or other data. In some embodiments, memory 702 and the additional storage 704 are examples of computer storage media. Memory 702 and/or additional storage 704 may include, but are not limited to, PRAM, SRAM, DRAM, RAM, ROM, EEPROM, flash memory or other memory technology, CD-ROM, DVD, magnetic tape, magnetic disk storage or other magnetic storage devices, or any other medium which can be used to store the desired information and which can be accessed by the computing device 700. Combinations of any of the above should also be included within the scope of computer-readable media. Computer-readable media may include computer-readable instructions, program engines, or other data transmitted within a data signal, such as a carrier wave, or other transmission. However, as used herein, computer-readable storage media does not include computer-readable communication media.

The memory 704 may include an operating system 708 and one or more data stores 710, and/or one or more application programs, engines, or services for implementing the features disclosed herein, such as the features provided by the Reporting System 714 (an example of the Reporting System 400 of FIG. 4).

The computing device may also contain communications connection(s) 716 that allow the computing device 700 to communicate with a stored database, another computing device, a server, user terminals and/or other devices (e.g., via one or more networks, not depicted). The computing device may also include I/O device(s) 718, such as a keyboard, a mouse, a pen, a voice input device, a touch input device, a display, speakers, a printer, etc.

The various embodiments further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, engines, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program engines, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method comprising:
receiving, by an ingestion engine, event data comprising a stream of received event instances, wherein each received event instance is associated with an entity of a plurality of entities and a capacity change;
identifying, by the ingestion engine, an event time for each received event instance of the stream of event instances;
sorting, by a management engine, the received event instances into a plurality of sets of instances, wherein each set of instances of the plurality of sets of instances is associated with a respective entity of the plurality of entities;
segmenting, by the management engine, each set of instances of the plurality of sets of instances into a plurality of subsets of instances based on the event time for each event instance of the set of instances, wherein each of the plurality of subsets of instances corresponds to a time period;
for at least one respective subset of instances of the plurality of subsets of instances;
generating, by a modeling engine, a feature vector comprising information identifying the respective subset of instances, the information identifying each respective subset of instances comprising at least a date, a time, and an entity identifier;
providing, by the modeling engine, the feature vector as input to a trained machine learning model; and
receiving, by the modeling engine, a capacity threshold as output from the trained machine learning model;
storing, by the management engine and to a data store, each segmented set of instances as stored event data; and
performing one or more operations with respect to the stored event data.

2. The method of claim 1, wherein the one or more operations comprise:
receiving, by an interface engine, a request identifying a particular entity and one or more time periods;
retrieving, by the management engine and from the data store, a requested event data from the stored event data, the requested event data corresponding to the particular entity and the one or more time periods; and
providing, by the interface engine, a user interface for exhibiting the requested event data.

3. The method of claim 1, wherein the segmenting comprises:
identifying, by the management engine, a net capacity change for each of the subsets of instances, the net capacity change of a respective subset of instances based at least in part on the capacity change of each event instance in the respective subset of instances.

4. The method of claim 3, wherein the one or more operations comprise:
comparing, by a modeling engine, a respective net capacity change of the respective subset of instances to the capacity threshold; and
providing, by an interface engine, a notification in response to the respective net capacity change exceeding the capacity threshold.

5. The method of claim 3, wherein the one or more operations comprise:
receiving, by an interface engine, a request identifying a time period;
identifying, by the management engine, one or more matching subsets of instances, wherein a matching subset of instances corresponds to the time period;
identifying, by the management engine, an order for the one or more matching subsets of instances, wherein the order is identified based at least in part on the net capacity change of each of the one or more matching subsets of instances; and
providing, by the interface engine, a user interface for exhibiting the one or more matching subsets in the order.

6. The method of claim 1, wherein the event time for a received event instance is a reception time at the ingestion engine.

7. A computing device, comprising:
one or more non-transitory memories; and
one or more processors in communication with the one or more non-transitory memories and configured to execute instructions stored in the one or more memories to:
receive, by an ingestion engine, event data comprising a stream of received event instances, wherein each received event instance is associated with an entity of a plurality of entities and a capacity change;
identify, by the ingestion engine, an event time for each received event instance of the stream of event instances;
sort, by a management engine, the received event instances into a plurality of sets of instances, wherein each set of instances of the plurality of sets of instances is associated with a respective entity of the plurality of entities;
segment, by the management engine, each set of instances of the plurality of sets of instances into a plurality of subsets of instances based on the event time for each event instance of the set of instances, wherein each of the plurality of subsets of instances corresponds to a time period;
for at least one respective subset of instances of the plurality of subsets of instances;
generate, by a modeling engine, a feature vector comprising information identifying the respective subset of instances, the information identifying each respective subset of instances comprising at least a date, a time, and an entity identifier;
provide, by the modeling engine, the feature vector as input to a trained machine learning model; and
receive, by the modeling engine, a capacity threshold as output from the trained machine learning model;
store, by the management engine and to a data store, each segmented set of instances as stored event data; and
perform one or more operations with respect to the stored event data.

8. The computing device of claim 7, wherein the one or more operations comprise instructions to:
receive, by an interface engine, a request identifying a particular entity and one or more time periods;
retrieve, by the management engine and from the data store, a requested event data from the stored event data, the requested event data corresponding to the particular entity and the one or more time periods; and provide, by the interface engine, a user interface for exhibiting the requested event data.

9. The computing device of claim 7, wherein the segmenting comprises instructions to:
identify, by the management engine, a net capacity change for each of the subsets of instances, the net capacity change of a respective subset of instances based at least in part on the capacity change of each event instance in the respective subset of instances.

10. The computing device of claim 9, wherein the one or more operations comprise instructions to:
compare, by a modeling engine, a respective net capacity change of the respective subset of instances to the capacity threshold; and
provide, by an interface engine, a notification in response to the respective net capacity change exceeding the capacity threshold.

11. The computing device of claim 9, wherein the one or more operations comprise instructions to:
receive, by an interface engine, a request identifying a time period;
identify, by the management engine, one or more matching subsets of instances, wherein a matching subset of instances corresponds to the time period;
identify, by the management engine, an order for the one or more matching subsets of instances, wherein the order is identified based at least in part on the net capacity change of each of the one or more matching subsets of instances; and
provide, by the interface engine, a user interface for exhibiting the one or more matching subsets in the order.

12. The computing device of claim 7, wherein the event time for a received event instance is a reception time at the ingestion engine.

13. A non-transitory computer-readable medium storing a plurality of instructions that, when executed by one or more processors of a computing device, cause the one or more processors to:
receive, by an ingestion engine, event data comprising a stream of received event instances, wherein each received event instance is associated with an entity of a plurality of entities and a capacity change;
identify, by the ingestion engine, an event time for each received event instance of the stream of event instances;
sort, by a management engine, the received event instances into a plurality of sets of instances, wherein each set of instances of the plurality of sets of instances is associated with a respective entity of the plurality of entities;
segment, by the management engine, each set of instances of the plurality of sets of instances into a plurality of subsets of instances based on the event time for each event instance of the set of instances, wherein each of the plurality of subsets of instances corresponds to a time period;
for at least one respective subset of instances of the plurality of subsets of instances;
generate, by a modeling engine, a feature vector comprising information identifying the respective subset of instances, the information identifying each respective subset of instances comprising at least a date, a time, and an entity identifier;
provide, by the modeling engine, the feature vector as input to a trained machine learning model; and
receive, by the modeling engine, a capacity threshold as output from the trained machine learning model;
store, by the management engine and to a data store, each segmented set of instances as stored event data; and
perform one or more operations with respect to the stored event data.

14. The non-transitory computer-readable medium of claim 13, wherein the one or more operations comprise instructions to:
receive, by an interface engine, a request identifying a particular entity and one or more time periods;
retrieve, by the management engine and from the data store, a requested event data from the stored event data, the requested event data corresponding to the particular entity and the one or more time periods; and
provide, by the interface engine, a user interface for exhibiting the requested event data.

15. The non-transitory computer-readable medium of claim 13, wherein the segmenting comprises instructions to:
identify, by the management engine, a net capacity change for each of the subsets of instances, the net capacity change of a respective subset of instances based at least in part on the capacity change of each event instance in the respective subset of instances.

16. The non-transitory computer-readable medium of claim 15, wherein the one or more operations comprise instructions to:
compare, by a modeling engine, a respective net capacity change of the respective subset of instances to the capacity threshold; and
provide, by an interface engine, a notification in response to the respective net capacity change exceeding the capacity threshold.

17. The non-transitory computer-readable medium of claim 15, wherein the one or more operations comprise instructions to:
receive, by an interface engine, a request identifying a time period;
identify, by the management engine, one or more matching subsets of instances, wherein a matching subset of instances corresponds to the time period;
identify, by the interface engine, an order for the one or more matching subsets of instances, wherein the order is identified based at least in part on the net capacity change of each of the one or more matching subsets of instances; and
provide, by the interface engine, a user interface for exhibiting the one or more matching subsets in the order.

* * * * *